US009045063B2

(12) United States Patent
Line et al.

(10) Patent No.: US 9,045,063 B2
(45) Date of Patent: Jun. 2, 2015

(54) ARTICULATING SEAT BOLSTERS

(71) Applicant: Ford Global Technologies, LLC, Dearborn, MI (US)

(72) Inventors: Johnathan Andrew Line, Northville, MI (US); Marc Kondrad, Macomb Township, MI (US); John W. Jaranson, Dearborn, MI (US); Lorne Joseph Lovelace, Macomb Township, MI (US); Michael Kolich, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 13/914,668

(22) Filed: Jun. 11, 2013

(65) Prior Publication Data

US 2014/0361590 A1    Dec. 11, 2014

(51) Int. Cl.
*A47C 3/00* (2006.01)
*A47C 4/46* (2006.01)
*B60N 2/44* (2006.01)
*B60N 2/66* (2006.01)

(52) U.S. Cl.
CPC .. *B60N 2/449* (2013.01); *B60N 2/66* (2013.01)

(58) Field of Classification Search
CPC ........ B60N 2/01; B60N 2/4882; B60N 2/449; B60N 2/66
USPC ........ 297/284.6, 284.4, 284.9, 284.1, 452.41, 297/284.3; 280/730.2, 728.2
See application file for complete search history.

(56) References Cited

U.S. PATENT DOCUMENTS

| 4,500,136 | A | * | 2/1985 | Murphy et al. | 297/284.9 |
| 4,601,514 | A | * | 7/1986 | Meiller | 297/284.4 |
| 4,607,887 | A | * | 8/1986 | Vail | 297/452.26 |
| 4,636,000 | A | * | 1/1987 | Nishino | 297/284.9 |
| 5,076,643 | A | * | 12/1991 | Colasanti et al. | 297/284.6 |
| 5,280,997 | A | * | 1/1994 | Andres et al. | 297/284.9 |

(Continued)

FOREIGN PATENT DOCUMENTS

| EP | 0670240 A1 | 9/1995 |
| GB | 2403139 A | 12/2004 |
| JP | 2009096422 A | 5/2009 |

OTHER PUBLICATIONS

Car Reviews, "Audi A4 saloon RS4," http://www.theaa.com/allaboutcars/cartestreports/2006037.html, Apr. 2006 (5 pages).

(Continued)

*Primary Examiner* — Chi Q Nguyen
(74) *Attorney, Agent, or Firm* — Vichit Chea; Price Heneveld LLP

(57) ABSTRACT

A vehicle seating assembly for a vehicle having a seat back and a seat. Bolsters extend laterally from one of the seat back and the seat and include a static projection, a cushion, and a dynamic projection disposed between the static projection and the cushion. The dynamic projection is operably coupled to one of the seat back and the seat. An articulation feature is disposed between the dynamic projection and the static projection and is operable between articulated and unarticulated conditions. A control is operably coupled to the articulation feature and is operational to move the articulation feature between the articulated and unarticulated conditions, which consequently move the dynamic projection relative to the static projection, respectively, thereby adjusting the angle of the cushion relative to one of the seat back and the seat.

19 Claims, 3 Drawing Sheets

(56) References Cited

U.S. PATENT DOCUMENTS

| | | | |
|---|---|---|---|
| 5,320,409 A | 6/1994 | Katoh et al. | |
| 5,558,398 A * | 9/1996 | Santos | 297/284.3 |
| 5,658,050 A | 8/1997 | Lorbiecki | |
| 5,711,575 A * | 1/1998 | Hand et al. | 297/284.6 |
| 6,088,642 A | 7/2000 | Finkelstein et al. | |
| 6,129,419 A * | 10/2000 | Neale | 297/284.4 |
| 6,629,715 B2 | 10/2003 | Oh et al. | |
| 6,672,666 B2 | 1/2004 | Stiller et al. | |
| 6,912,748 B2 | 7/2005 | VanSickle | |
| 7,125,077 B2 | 10/2006 | Frank | |
| 7,469,968 B2 * | 12/2008 | Hazlewood | 297/452.58 |
| 7,490,899 B2 * | 2/2009 | McMillen | 297/284.1 |
| 7,963,553 B2 * | 6/2011 | Huynh et al. | 280/730.2 |
| 7,980,617 B2 * | 7/2011 | Brncick et al. | 296/64 |
| 8,126,615 B2 | 2/2012 | McMillen et al. | |
| 8,602,449 B2 * | 12/2013 | Kojima | 280/730.2 |
| 2005/0225140 A1 * | 10/2005 | Kneeshaw | 297/284.4 |
| 2010/0283229 A1 | 11/2010 | Feller et al. | |

OTHER PUBLICATIONS

Recaro GMBH & Co. KG, "Seat Range," ID No. 7218054, Mar. 2010 (21 pages).

Kelly Blue Book, "2011 Mercedes-Benz CL-Class," http://www.kbb.com/mercedes-benz/cl-class/2011-mercedes-benz-cl-class/, Feb. 28, 2013 (5 pages).

Lexus, "The all-new LEXUS 2013," lexus.com P2-332, 02/12 (13 pages).

Mercedes-Benz, "Interior comfort—spoilt for choice," http://www.zungfu.com/pc_E_saloon.comfort.1.shtml, Feb. 28, 2013 (3 pages).

* cited by examiner

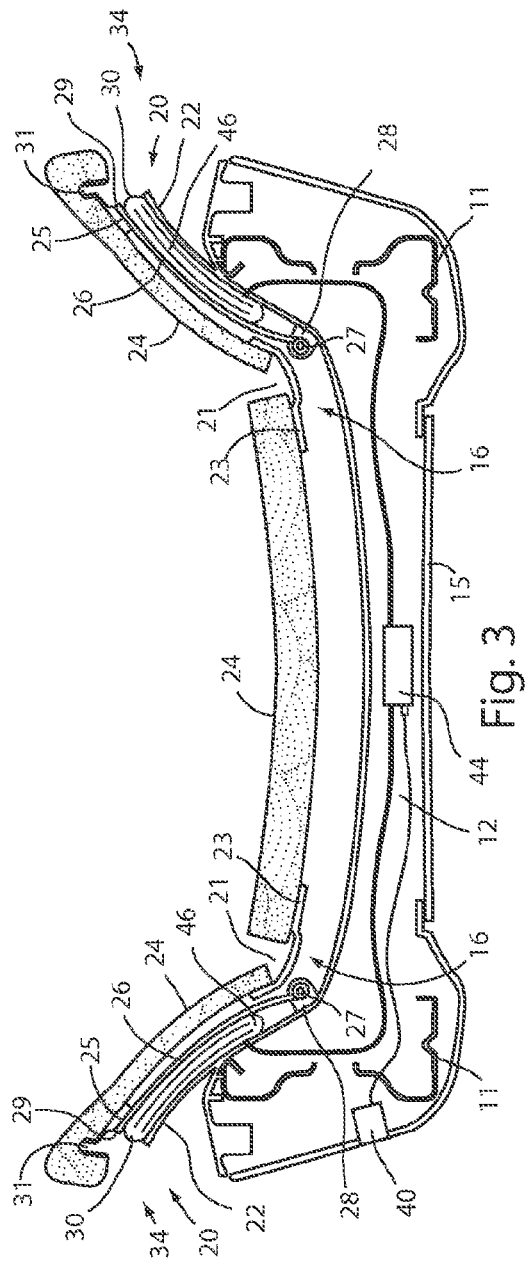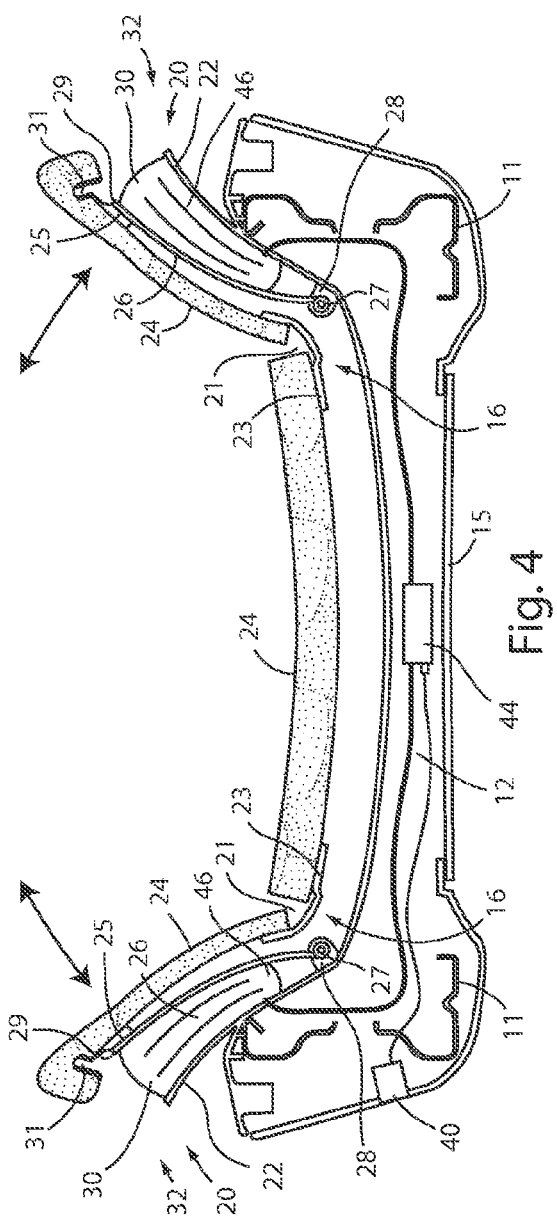

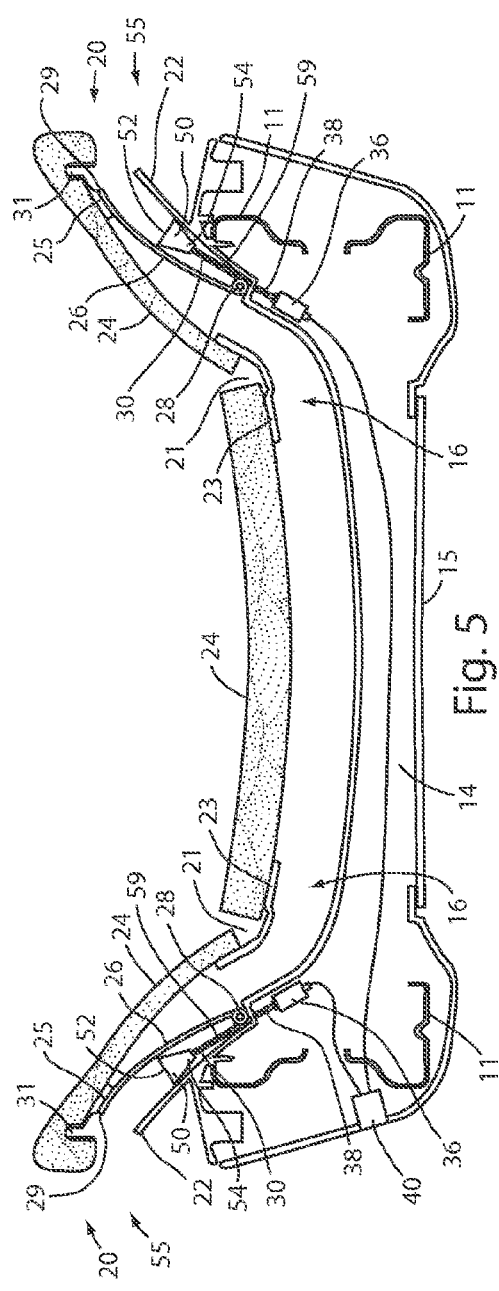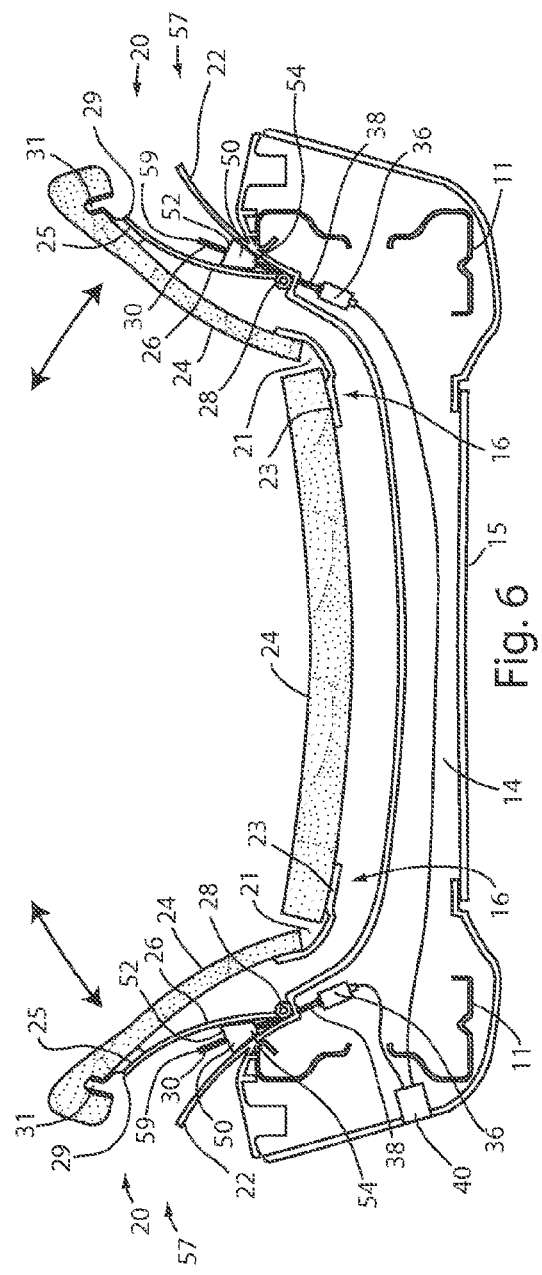

US 9,045,063 B2

ARTICULATING SEAT BOLSTERS

FIELD OF THE INVENTION

The present invention generally relates to a vehicle seating assembly for a vehicle, and more particularly to a vehicle seating assembly with articulating seat bolsters.

BACKGROUND OF THE INVENTION

Seat bolsters are generally configured to provide supplemental support to the back and thighs of a vehicle passenger.

SUMMARY OF THE INVENTION

One aspect of the present invention includes a vehicle seating assembly for a vehicle having a seat back and a seat. Bolsters extend laterally from one of the seat back and the seat and include a static projection, a cushion, and a dynamic projection disposed between the static projection and the cushion. The dynamic projection is operably coupled to one of the seat back and the seat. An articulation feature is disposed between the dynamic projection and the static projection and is operable between articulated and unarticulated conditions. A control is operably coupled to the articulation feature and is operational to move the articulation feature between the articulated and unarticulated conditions, which consequently moves the dynamic projection relative to the static projection, respectively, thereby adjusting the angle of the cushion relative to one of the seat back and the seat.

Another aspect of the present invention includes a vehicle seating assembly for a vehicle having a seat back and a seat. Bolsters extend laterally from one of the seat back and the seat and include a static projection. A dynamic projection is operably coupled to the static projection by a hinge assembly. An inflatable bladder is disposed between the dynamic projection and the static projection and is operable between inflated and deflated conditions by a pump. A control is operably coupled to the pump.

Yet another aspect of the present invention includes a vehicle seating assembly for a vehicle having a seat back and a seat. Bolsters extend laterally from one of the seat back and the seat and include a static projection. A dynamic projection is operably coupled to the static projection by a hinge assembly. A wedge is disposed between the dynamic projection and the static projection and is operable between retracted and extended conditions by a motor. A control is operably coupled to the motor.

Yet another aspect of the present invention includes a vehicle seating assembly having bolsters laterally extending from the seat, the seat back, and the upper seat back. The bolsters are configured to come into abutting contact with a vehicle passenger while in the articulated condition. The bolsters provide support and minimize passenger movement during vehicle movement. This allows the vehicle passenger to enjoy a safer and more secure driving experience. The bolsters may be connected to a vehicle bus which determines and anticipates road conditions and cornering in order to provide the most enjoyable experience. Moreover, the bolsters are moved to the unarticulated condition upon a user command to allow the vehicle passenger easy egress or ingress from or to the vehicle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a top cross-sectional plan view taken at line A of the vehicle seating assembly of FIG. 2 in an unarticulated condition;

FIG. 4 is a top cross-sectional plan view taken at line A of the vehicle seating assembly of FIG. 2 in an articulated condition;

FIG. 5 is a front cross-sectional elevational view taken at line B of the vehicle seating assembly of FIG. 2 in the unarticulated condition; and FIG. 6 is a front cross-sectional elevational view taken at line B of the vehicle seating assembly of FIG. 2 in the articulated condition.

DETAILED DESCRIPTION OF THE EMBODIMENTS

Figure 1:
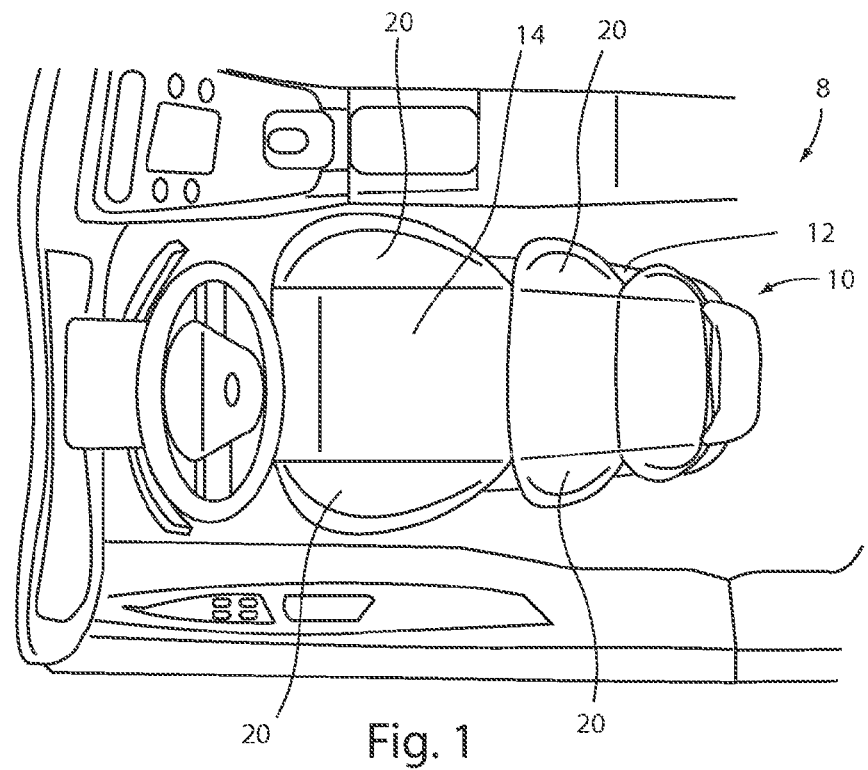
FIG. 1 is a top plan view of a vehicle seating assembly according to the present invention.
Figure 2:
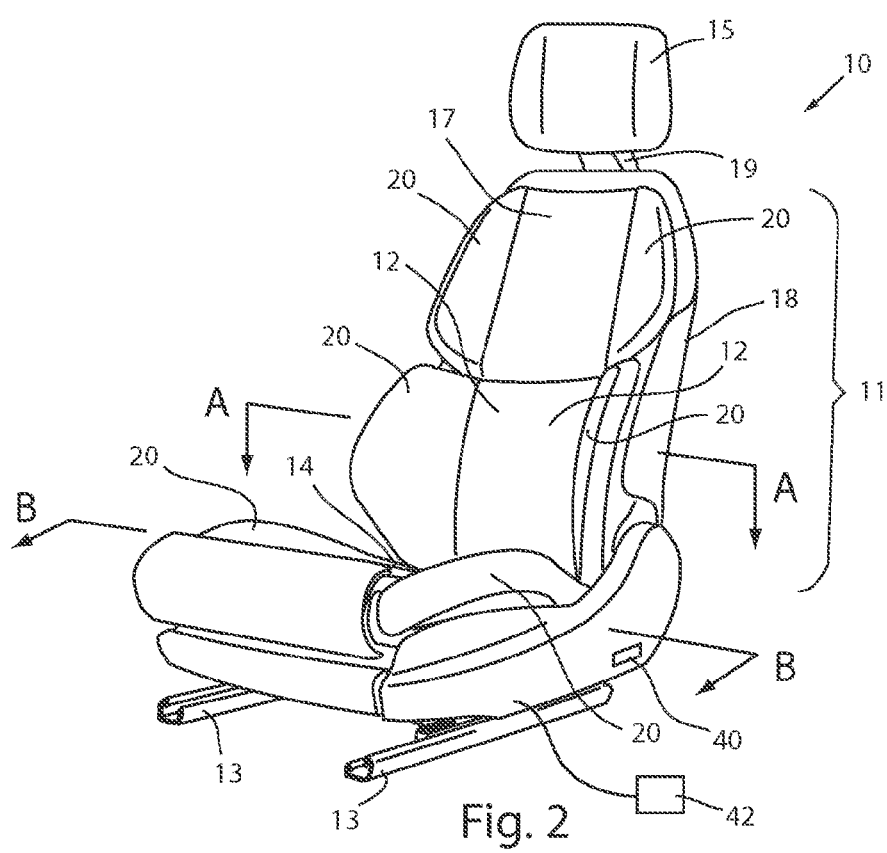
FIG. 2 is a side perspective view of a vehicle seating assembly according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a vehicle seating assembly for use in a vehicle cabin 8 and includes a lower seat back 12 and a seat 14. Bolsters 20 extend laterally from one of the seat back 11 and the seat 14 and include a static projection 22, a cushion 24, and a dynamic projection 26 disposed between the static projection 22 and the cushion 24. The dynamic projection 26 is operably coupled to one of the seat back 11 and the seat 14. An articulation feature 30 is disposed between the dynamic projection 26 and the static projection 22 and is operable between an articulated condition 32 and an unarticulated condition 34. A control 40 is operably coupled to the articulation feature 30 and is operational to move the articulation feature 30 between the articulated condition 32 and the unarticulated condition 34, which consequently moves the dynamic projection 26 relative to the static projection 22. Consequently, the angle of the cushion 24 is adjusted relative to one of the seat back 11 and the seat 14.

Referring again to FIGS. 1 and 2, one embodiment of the vehicle seating assembly 10 is illustrated inside the vehicle cabin 8. The vehicle seating assembly 10 may be a seat for a driver, a seat for a passenger, a rear bucket seat, a rear row of seats, or any other vehicle seat. The vehicle seating assembly 10 includes the seat back 11 which includes a lower seat back 12 and an upper seat back 17, the seat 14, and the plurality of bolsters 20 disposed on each of the lower seat back 12, the seat base 14, and the upper seat back 17. The vehicle seating assembly 10 includes a back surface 18. Moreover, the vehicle seating assembly 10 may also include a head restraint 15 operably coupled to the back surface 18 of the vehicle seating assembly 10 by a support 19. The vehicle seating assembly 10 also includes a vehicle seat frame 11 (FIGS. 3-6) configured to provide structural support to the vehicle seating assembly 10 and a hard back panel 15. The vehicle seating assembly 10 is supported on rail assemblies 13. The bolsters 20 may be disposed laterally on any or all of the seat 14, the lower seat back 12, or the upper seat back 17. In the illustrated embodiment shown in FIG. 2, each of the seat 14, the lower seat back 12, and the upper seat back 17 includes bolsters 20 that extend from side portions thereof.

Referring now to the embodiment shown in FIGS. 3 and 4, the bolsters 20 of the seat back 11 are configured to provide lateral support to a vehicle passenger. The bolsters 20 are disposed on each side of the cushion 24. The cushion is configured to provide a comfortable seating surface to the passenger. The cushion 24 allows the bolsters 20 to be hidden from view and not be felt by the passenger when occupying the vehicle seating assembly 10. The cushion 24 also provides the vehicle seating assembly 10 with a uniform look and feel.

As shown in the embodiment of FIGS. 3 and 4, the bolsters 20 are typically disposed adjacent to a recess 16, which is disposed behind the cushion 24. The bolsters 20 also include the static projection 22 and the dynamic projection 26. A hinge assembly 28 operably couples the dynamic projection 26 to the vehicle seating assembly 10. The bolsters 20, along with the static projection 22 and the dynamic projection 26, are generally made of a polymeric material, which is configured to support the weight of a passenger during vehicle occupancy. A more sturdy material, such as steel, may be used, as desired by one of ordinary skill in the art to provide additional support.

Referring again to the embodiment shown in FIGS. 3 and 4, as noted above, the dynamic projection 26 is disposed between the static projection 22 and the cushion 24. As illustrated, the static projection 22 and the dynamic projection 26 include an arcuate cross-section. However, the static projection 22 and the dynamic projection 26 may take on other configurations as well. The dynamic projection 26 of the bolster 20 has a distal end 29, which is engaged with a connector 25. The connector 25 is disposed behind the cushion 24 and provides a solid surface for the dynamic projection 26 to engage the bolster 20. The connector 25 may be elastic, or otherwise flexible, in order to absorb the forces associated with movement of the dynamic projection 26 from the unarticulated condition 34 to the articulated condition 32, as well as forces exerted on the cushion 24 by a passenger during travel. Moreover, a space 31 is disposed adjacent to the connector 25. The connector 25 may encroach into the space 31 during the articulation from the unarticulated condition 34 to the articulated condition 32. The dynamic projection 26 is configured to move the bolsters 20 between a deployed position (FIG. 4) and a non-deployed position (FIG. 3). The bolsters 20, in turn, interact with and support the body of the passenger during driving and cornering.

As shown in the embodiment of FIGS. 3 and 4, the dynamic projection 26 is moved from the non-deployed position (FIG. 3) to the deployed position (FIG. 4) when the articulation feature 30 moves from the unarticulated condition 34 to the articulated condition 32. The articulation feature 30 is generally disposed between the dynamic projection 26 and the static projection 22. The control 40 may be operably coupled to the articulation feature 30. The control 40 moves the articulation feature 30 from the unarticulated condition 34 (FIG. 3) to the articulated condition 32 (FIG. 4) and from the articulated condition 32 to the unarticulated condition 34. When the articulation feature 30 is in the articulated condition 32 (FIG. 4), the distal end 29 of the dynamic projection 26 is moved relative to the static projection 22. Consequently, the bolster 20 is moved by the dynamic projection 26. The bolster 20 moves toward or away from the back and side of a passenger in order to provide increased or decreased support, respectively, for the passenger. This articulation can be accomplished via the control 40 or via a vehicle bus 42 (FIG. 2) in order to anticipate turns and cornering ahead of the vehicle moving forward.

As shown in FIGS. 3-6, the articulation feature 30 may be one of many different articulation features, including, but not limited to, an inflatable bladder 46 (FIGS. 3 and 4), a wedge 50 (FIGS. 5 and 6), a worm gear control 38, or any combination thereof. In the embodiment shown in FIGS. 3 and 4, the articulation feature 30 is shown as inflatable bladder 46. The inflatable bladder 46 may be made of an elastic material such that an exterior surface of the bladder 46 is smooth, or any other material, including, but not limited to, a material that folds accordion-style or is gathered while in the unarticulated condition 34. The inflatable bladder 46 is operably connected to a pump 44, which is configured to inflate the bladder 46 causing the dynamic projection 26 to be moved into the articulated condition 32 (FIG. 4). The pump 44 may also be configured to deflate the bladder 46 to the unarticulated condition 34. The bladder 46 may be activated by a pre-set user condition, or by the control 40. Additionally, the vehicle bus 42, which monitors speed and steering of the vehicle, may be operably connected to the control 40 which activates inflation of the inflatable bladder 46 when the predetermined speed and/or steering movement has been satisfied by the vehicle bus 42.

Referring now to FIGS. 5 and 6, another embodiment of an articulation feature 30 includes the wedge 50 and the worm gear control 38. The wedge 50 has a first end 52 and a second end 54 and is disposed between the dynamic projection 26 and the static projection 22. A first end 52 of the wedge 50 is wider than a second end 54 of the wedge 50. This configuration aids in providing adequate movement of the dynamic projection 26 as the wedge 50 moves from an unarticulated condition 55 (FIG. 5) to an articulated condition 57 (FIG. 6). In the illustrated embodiment, the moveable wedge 50 is operably coupled to the worm gear control 38 which may be operably coupled to a motor 36. The worm gear control 38 extends through an aperture 27 in the dynamic projection 26.

Referring again to FIGS. 5 and 6, the articulation feature 30 is designed to move the bolsters 20 between deployed and non-deployed positions. In operation, a user activates the control 40 to activate the motors 36. As the motors 36 are activated, the motors 36 rotate the worm gear 58, which causes the wedge 50 to move outwardly or inwardly on the worm gear 58 between extended and retracted conditions, respectively. When the wedge 50 moves outwardly on the worm gear 58, the bolsters 20 are moved to the non-deployed position (FIG. 5). When the worm gear 58 is rotated in the opposite direction, the wedge 50 is drawn toward the motor 36, which forces the dynamic projection 26 and the static projection 22 apart, which consequently moves the bolsters 20 to the deployed position.

It will also be understood that the articulation feature 30, as illustrated in FIGS. 5 and 6, may be automatically activated, depending on preferred settings developed by the vehicle manufacturer or a user. Specifically, the user may configure the articulation feature 30 to operate when the vehicle reaches a predetermined speed or corners at a predetermined speed. In this instance, the bolsters 20 provide additional support to the user.

With respect to the embodiments shown in FIGS. 3-6, it is also contemplated that the articulation feature 30 will move the bolsters 20 between the deployed and non-deployed positions by pivoting the bolsters 20 relative to the cushion 24.

The bolsters 20 and cushion 24 are connected by a flexible material that allows movement of the bolsters 20 relative to the cushion 24.

Moreover, it will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly for a vehicle comprising:
    a seat back and a seat; and
    bolsters extending laterally from one of the seat back and the seat and including:
        a static projection;
        a cushion;
        a dynamic projection disposed between the static projection and the cushion, the dynamic projection being pivotally coupled to the static projection and to one of the seat back and the seat by a hinge assembly;
        an articulation feature disposed between the dynamic projection and the static projection and operable between articulated and unarticulated conditions; and
        a user control operably coupled to the articulation feature and operational to move the articulation feature between the articulated and unarticulated conditions, which consequently moves the dynamic projection away from and toward the static projection, respectively, thereby adjusting an angle of the cushion relative to one of the seat back and the seat.

2. The vehicle seating assembly of claim 1, wherein the static projection and the dynamic projection are operably coupled with the seat back at a recess defined in the one of the seat and the seat back.

3. The vehicle seating assembly of claim 1, wherein at least one of the static projection and the dynamic projection includes an arcuate cross-section.

4. The vehicle seating assembly of claim 1, wherein a distal end of the dynamic projection is slidably engaged with a connector operably engaged with the dynamic projection.

5. The vehicle seating assembly of claim 1, wherein the control is operably coupled to a vehicle bus that monitors speed and steering of the vehicle, and wherein the control activates inflation of an inflatable bladder when a predetermined speed and steering movement have been satisfied by the vehicle bus.

6. The vehicle seating assembly of claim 1, wherein the articulation feature includes an inflatable bladder disposed between the dynamic projection and the static projection.

7. The vehicle seating assembly of claim 1, wherein the articulation feature includes a moveable wedge disposed between the dynamic projection and the static projection.

8. A vehicle seating assembly for a vehicle comprising:
    a seat back and a seat; and
    bolsters extending laterally from one of the seat back and the seat and including:
        a static projection;
        a dynamic projection operably coupled to the static projection and to one of the seat back and the seat by a hinge assembly;
        an inflatable bladder disposed between the dynamic projection and the static projection and operable between inflated and deflated conditions by a pump; and
        a control operably coupled to the pump.

9. The vehicle seating assembly of claim 8, wherein at least one of the static projection and the dynamic projection includes an arcuate cross-section.

10. The vehicle seating assembly of claim 8, further comprising:
    a cushion engaged with the dynamic projection.

11. The vehicle seating assembly of claim 8, wherein the control is operably coupled to a vehicle bus that monitors speed and steering of the vehicle, and wherein the control activates inflation of the inflatable bladder when a predetermined speed and steering movement have been satisfied by the vehicle bus.

12. A vehicle seating assembly for a vehicle comprising:
    bolsters extending laterally from one of a seat back and a seat and including:

a dynamic projection operably coupled to a static projection and one of the seat back and seat by a hinge assembly;

a wedge disposed between the dynamic projection and the static projection and moveable forward and rearward between retracted and extended conditions by a motor; and a control operably coupled to the motor.

13. The vehicle seating assembly of claim 12, wherein the motor is operably coupled to a worm gear that is operably coupled to the wedge.

14. The vehicle seating assembly of claim 13, wherein the worm gear extends through an aperture in the dynamic projection.

15. The vehicle seating assembly of claim 12, wherein the wedge includes a first end and a second end, wherein the first end is wider than the second end.

16. The vehicle seating assembly of claim 15, wherein the control is manually adjustable by a passenger.

17. The vehicle seating assembly of claim 12, wherein at least one of the static projection and the dynamic projection includes an arcuate cross-section.

18. The vehicle seating assembly of claim 12, wherein the control is operably coupled to a vehicle bus that monitors speed and steering of the vehicle, and wherein the control retracts the wedge when one of a predetermined speed and steering movement has been satisfied by the vehicle bus.

19. The vehicle seating assembly of claim 12, further comprising:

a cushion engaged with the dynamic projection.

* * * * *